United States Patent [19]
Martens et al.

[11] Patent Number: 5,519,268
[45] Date of Patent: May 21, 1996

[54] OSCILLATING SYSTEM

[75] Inventors: Helmut W. Martens, Syke; Wolfram Klebl, Isernhagen; Rainer Brünn, Essel, all of Germany

[73] Assignee: kabelmetal electro GmbH, Hanover, Germany

[21] Appl. No.: 204,942

[22] Filed: Mar. 2, 1994

[30] Foreign Application Priority Data

Mar. 3, 1993 [DE] Germany .................. 43 06 523.6

[51] Int. Cl.⁶ .................................................. H02K 33/00
[52] U.S. Cl. .................................................. 310/36; 335/274
[58] Field of Search .................... 310/36, 38; 335/272, 335/273, 274

[56] References Cited

U.S. PATENT DOCUMENTS

| | | | |
|---|---|---|---|
| 4,838,954 | 6/1989 | Perach | 137/625.65 |
| 4,954,799 | 9/1990 | Kumar | 335/273 X |
| 4,988,074 | 1/1991 | Najmolhoda | 335/274 X |
| 5,040,303 | 8/1991 | Koerner | 33/286 |

OTHER PUBLICATIONS

Brochure, Kabelmetal electro GmbH, High Speed Bandmarker, 4 pages date unknown.

Primary Examiner—Steven L. Stephan
Assistant Examiner—Judson H. Jones
Attorney, Agent, or Firm—Ware, Fressola, Van Der Sluys & Adolphson

[57] ABSTRACT

An electromagnetic oscillating system is disclosed and includes an electromagnet with at least two poles. Each of the poles carry at least one electric excitation winding for connection to an alternating electric field. A rotor is disposed between the poles and includes a shaft that is rotatably disposed within the bore of the electromagnetic windings. The shaft is hollow and has a torsional spring disposed therein. One end of the torsional spring is rigidly attached within the shaft, while the other end extends from the shaft and is rigidly fixed to a stationary point.

2 Claims, 2 Drawing Sheets

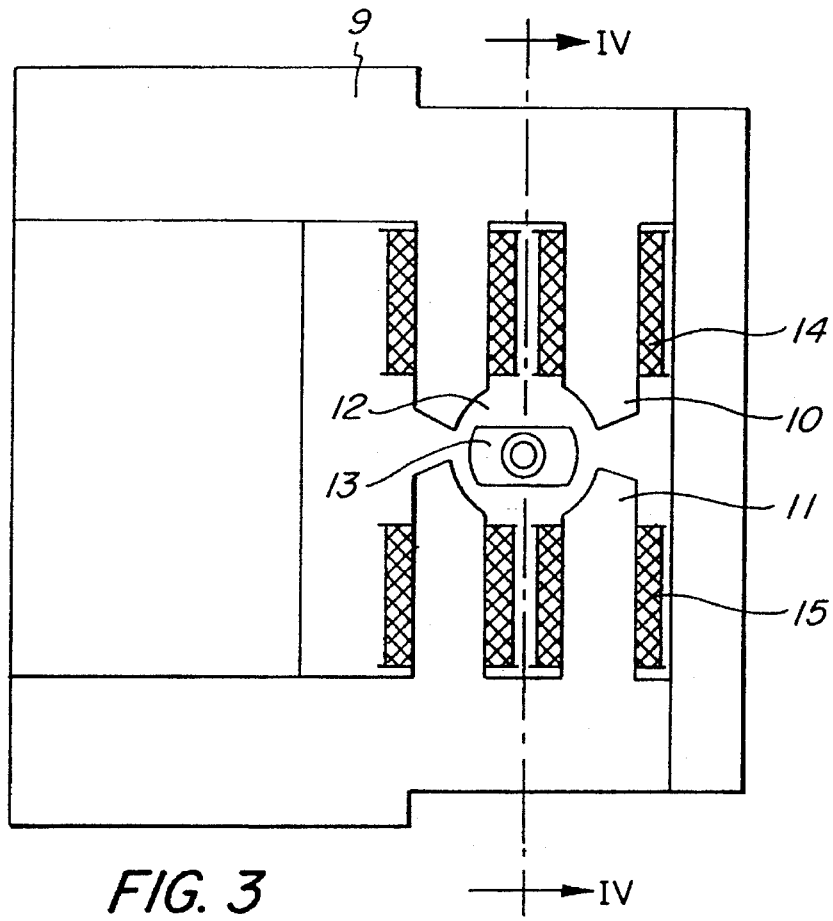
FIG. 3
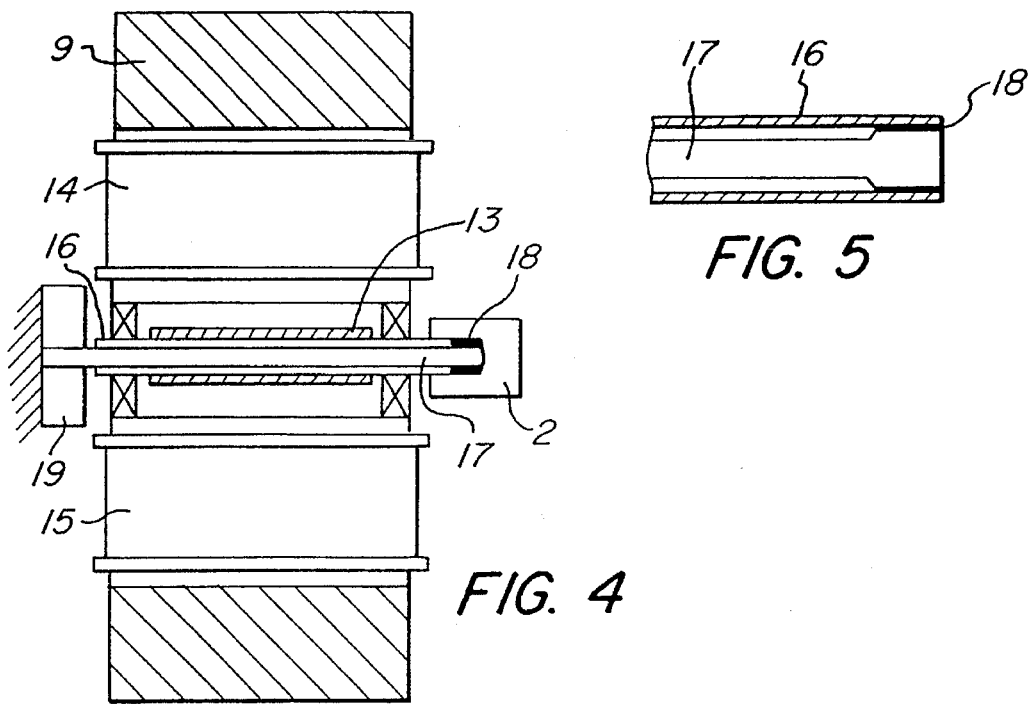
FIG. 4
FIG. 5

1
OSCILLATING SYSTEM

BACKGROUND OF THE INVENTION

The present invention generally relates to an oscillating system and, in particular, relates to one such oscillating system having a torsional spring disposed within the shaft of a rotor.

In general, oscillating systems are widely known and are used in many configurations and arrangements. Although oscillating systems can be used for many purposes, the application of an oscillating system as discussed herein is directed to the use thereof in a code marking system.

Typically, code marking equipment is designed to apply markings upon elongated structures, or cores, such as telecommunication cables, or the like. One particular code marking apparatus that is readily available on the commercial market is generally known by the name "Colomat". In that particular piece of equipment, an ink nozzle is affixed to the shaft of a rotor of the oscillating system. In operation, a jet of ink, or paint, is dispersed out of the nozzle in a direction that is generally perpendicular to the axis of the shaft. The amplitude and frequency of the jet of paint are adjustable. The jet of ink, or paint, hits the elongated structure, or core, and thus provides a marking stripe or band. The core, or elongated workpiece, is moved in a longitudinal direction crosswise to the jet of ink. The core, or elongated workpiece, is thus provided with markings along the surface thereof that appear as bands of ink along the longitudinal direction of the core.

Although such conventional apparatus works quite satisfactorily, it nevertheless has at least one significant drawback. Specifically, this significant drawback is caused by the overall length of the apparatus. One of the controlling features that causes the overall length of such an apparatus to be long is the torsion spring that is affixed to the shaft of the rotor. Conventionally, the torsion spring is attached at one end of the shaft of the rotor and extends axially from that end. As a result, the apparatus is inherently long and the requisite space required for the installation and use of such an apparatus is, in many instances, prohibitive of various implementations or desired changes in the configuration of the equipment. One particular configuration that is effectively prohibited, for example, is that the apparatus is so long that only a very limited number of such apparatus can be used at the same time. That is, in some instances, it is desirable to operate several apparatus that are to be used side by side. Such an arrangement would be quite difficult to accomplish with the current code marking apparatus.

Consequently, it is highly desirable to provide an oscillating system, particularly useful in a code marking system, that overcomes the above-recited drawback of current systems.

SUMMARY OF THE INVENTION

Accordingly, it is one object of the present invention to provide an oscillating system that overcomes the above-identified drawback of the present oscillating systems.

This object is accomplished, at least in part, by an oscillating system having a torsional spring disposed within the shaft of a rotor.

The present invention includes a configuration that significantly diminishes the space needed for installation of the system while providing consistent code marking quality.

More particularly, the present oscillating system includes an electromagnet with at least two poles. Each of the electromagnetic poles includes at least one electric excitation winding for connection to an alternating electric field. The poles define an opening wherein a rotor is disposed. The rotor includes a rotatable hollow shaft wherein a torsional spring extends along the axial direction of the shaft. In the preferred embodiment, the shaft of the rotor is hollowed out and a torsional spring is disposed in the hollow of the shaft. The torsional spring has one end fixed within the shaft while the other end of the torsional spring extends from the shaft to be rigidly affixed to a fixed, or immobile, point.

Advantageously, the oscillating system of the present invention, due to the relocation of the torsional spring into the shaft, has a significantly reduced overall length due to the reduced length of the rotor and the rotor shaft. The torsional spring may essentially remain of same dimensions as used in conventional systems. As a result, the drawback force, i.e., the force by which the torsional spring attempts to keep the rotor in its initial position, is fully preserved. Thus, the present oscillating system is especially advantageous wherein several of such systems are to be arranged side by side in as small a space as possible. Such a side by side arrangement is important if an elongated structure, or core, is to be provided with different or variable markings.

Other objects and advantages will become apparent to those skilled in the art from the following detailed description of the invention read in conjunction with the appended claims and the drawings attached hereto.

BRIEF DESCRIPTION OF THE DRAWINGS

The drawings, not drawn to scale, include:

FIG. 3 which is a cross sectional view of an oscillating system embodying the principles of the present invention;

FIG. 4 which is a cross sectional view of oscillating system shown in FIG. 3 taken along the line IV—IV thereof; and FIG. 5 which is a detail view of the shaft of the rotor as shown in FIG. 4 and embodying the principles of the present invention.

DETAILED DESCRIPTION OF THE INVENTION

Figure 1:
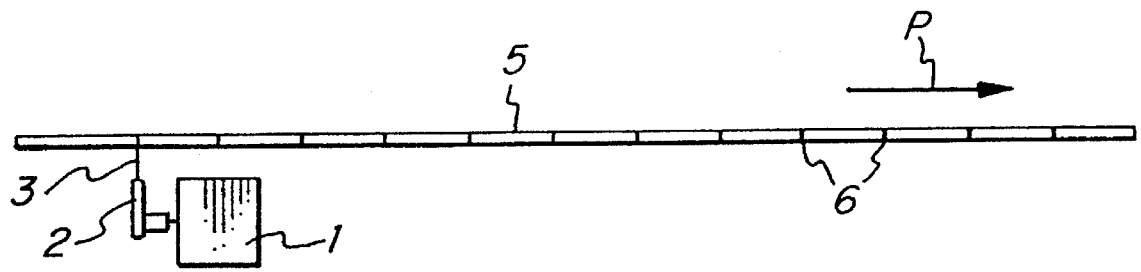
FIG. 1 which is a pictorial view of a marking apparatus including an oscillating system embodying the principles of the present invention.
Figure 2:
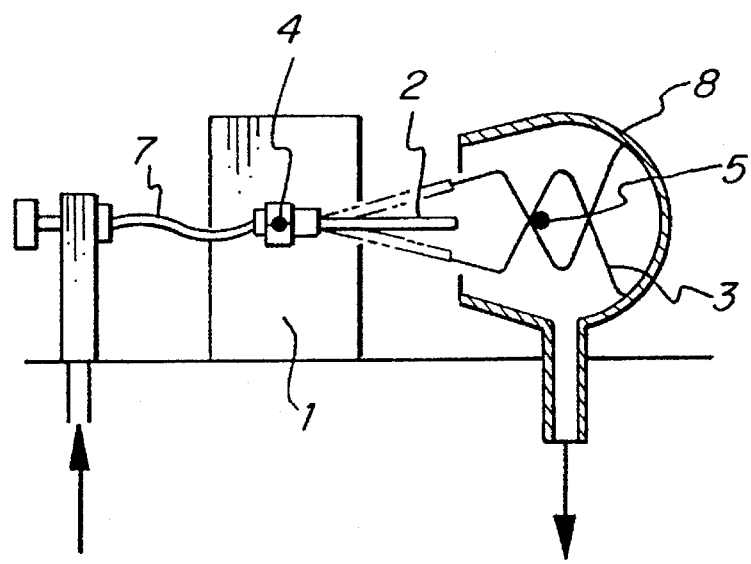
FIG. 2 which is a detailed view of an oscillating system particularly useful in the apparatus shown in FIG. 1.

An oscillating system, generally indicated at 1 in the Figures and embodying the principles of the present invention, when used in a code marking apparatus, includes a nozzle 2 that is preferable disposed such that, during operation, a jet of ink 3 is expelled therefrom via an escape opening 20 disposed substantially perpendicular to the axis about which the nozzle 2 oscillates. The nozzle 2 oscillates with an adjustable frequency, which for example, may typically be between 10 and 600 Hz, around an oscillating axis 4. As a result, the jet of ink that is expelled therefrom oscillates with the intended amplitude and frequency. The jet of ink hits a core 5 that, in the preferred embodiment, is moving in the direction indicated by arrow P to thus creates markings 6 on the surface of the core 5. The markings 6 have a predetermined width in the longitudinal dimension of the core 5. Further, the bands, or stripes, are spaced apart from each other. The spacing between the markings 6 being dependent upon the oscillating frequency of nozzle 2 and on the velocity of the core 5 as it is moved in the direction indicated by arrow P.

In the embodiment shown, the nozzle 2 is supplied with ink, or paint, from an ink, or paint, container, not shown in the drawing, through a tube 7. Preferably, the tube 7 is flexible to allow the continuous flow of ink during operation regardless of the oscillations. The portion of the jet of ink 3 that does not strike the core 5 is, in the preferred embodiment, caught by an ink-collecting shell 8. The surplus ink is then returned to the ink container.

Although the oscillating system has been shown and discussed as being used in a code marking equipment it will be understood that such an oscillating system can be used anywhere where an oscillating system is needed.

As shown in FIG. 3, the electromagnetic oscillating system 1 includes an electromagnet with a stator 9 having two poles 10 and 11. The two poles 10 and 11 are, in the preferred embodiment, each divided into two partial poles that are symmetrically disposed around a bore 12 of the electromagnet. A rotor 13 is disposed in the bore 12 and is provided with bearings so that the rotor 13 is rotatable within the bore 12. Each pole, 10 and 11, respectively, is provided with an excitation winding, 14 and 15, respectively, that, in the preferred embodiment, includes two aligned partial windings. It will be understood that more than two partial poles and corresponding excitation windings may also be used.

In the preferred embodiment, the rotor 13 is mounted on a shaft 16 that is mounted to rotate in the bore 12 of the stator 9. Preferably, the shaft 16 is hollow. A torsional spring 17 is mounted within the hollow shaft 16. The torsional spring 17 has one end thereof attached at a point 18 within the shaft 16. The other end of the torsional spring 17 extends out of the shaft 16 and is rigidly affixed to a stationary point 19. Hence, when the rotor 13 rotates within the bore 12, the shaft 16 causes the torsional spring 17 to be wound or unwound thereby creating a return force to be built up in the torsional spring 17. As a result, the force created in the torsional spring 17 acts as a bias, or return, force. In the embodiment shown, the nozzle 2 is attached to the end of the shaft 16 that is distal the end from which the torsional spring 17 protrudes, i.e., distal the stationary point 19. In such an embodiment, the nozzle 2 effectively oscillates about the axis of the shaft 16 such that ink, or paint, is expelled therefrom via the escape opening 202.

During operation of the oscillating system 1, the excitation windings 14 and 15 are connected to an alternating voltage source. In the preferred embodiment, a voltage source that provides a rectangularly shaped waveform is used. The torsional spring 17 maintains the rotor 13 in its initial position, shown in FIG. 3, as long as there are no forces acting thereon. When the alternating voltage is applied to the excitation windings 14 and 15 the torsional spring 17 is rotated by the working alternating field in both directions only through a small angle. The rapid oscillating movement of the rotor 13 is supported by the torsional spring 17, which operates to counteract the rotation of the shaft 16 and always tries to return the rotor 13 to the initial position thereof.

Although the present invention has been described herein with respect to one or more particular embodiments, it will be understood that other arrangements and configurations can be implemented without departing from the spirit and scope hereof. Hence, the present invention is deemed limited only by the appended claims and the reasonable interpretation thereof.

What is claimed is:

1. An electromagnetic oscillating system for use in a code marking system, comprising:

an electromagnet having at least two poles, each pole including at least one electric excitation winding adapted for connection to an alternating electric field; said poles being arranged to define a bore in said electromagnet; and a rotor disposed for rotation within said bore, said rotor being mounted on a hollow shaft such that said shaft rotates together with said rotator within said bore, said shaft having a torsional spring disposed therewithin, said torsional spring having one end thereof affixed within said shaft and the other end thereof extending from said shaft and affixed to a stationary point;

wherein, in the absence of said alternating electric field applied to said electric excitation windings of said poles, said torsion spring maintains said shaft and said rotor in an initial position within said bore; and wherein, in response to said alternating electric field being applies to said electric excitation windings of said poles, said rotor is rotated in alternating directions within said bore, thereby rotating said shaft in said alternating directions, and said torsional spring counteracts said alternating rotation of said shaft and said rotor and applies a force to said shaft to return said shaft and said rotor to said initial position within said bore.

2. The oscillating system as claimed in claim 1, further including a nozzle, said nozzle being affixed to one end of said shaft of said rotor, said nozzle communicating with a tube such that paint can be provided thereto, said nozzle having an escape opening substantially perpendicular to the direction of the axis of said shaft.

* * * * *